(12) United States Patent
Nandula et al.

(10) Patent No.: US 10,450,870 B2
(45) Date of Patent: Oct. 22, 2019

(54) FRANGIBLE GAS TURBINE ENGINE AIRFOIL

(71) Applicant: General Electric Company, Schenectady, NY (US)

(72) Inventors: Phani Nandula, Bangalore (IN); Suresh Subramanian, Bangalore (IN); Nicholas Joseph Kray, Mason, OH (US); Gregory Carl Gemeinhardt, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/018,902

(22) Filed: Feb. 9, 2016

(65) Prior Publication Data

US 2017/0226867 A1 Aug. 10, 2017

(51) Int. Cl.
 *F01D 5/14* (2006.01)
 *F02C 3/06* (2006.01)

(52) U.S. Cl.
 CPC ............. *F01D 5/147* (2013.01); *F02C 3/06* (2013.01); *F05D 2220/32* (2013.01)

(58) Field of Classification Search
 CPC . F01D 5/147; F01D 5/14; F01D 5/282; F01D 9/02; F05D 2260/311; F05D 2240/12; F05D 2240/30; F05D 2240/301; F05D 2300/603–6034
 See application file for complete search history.

(56) References Cited

U.S. PATENT DOCUMENTS

| | | | |
|---|---|---|---|
| 4,310,132 A | 1/1982 | Robinson et al. | |
| 5,951,800 A | 9/1999 | Pettit | |
| 6,648,273 B2 | 11/2003 | Anast | |
| 7,575,417 B2 | 8/2009 | Finn et al. | |
| 8,061,035 B2 | 11/2011 | Stulc et al. | |
| 8,197,191 B2 | 6/2012 | Binks et al. | |
| 8,753,091 B1 * | 6/2014 | Braley | F03D 1/0675 416/226 |

(Continued)

FOREIGN PATENT DOCUMENTS

| | | |
|---|---|---|
| EP | 0 526 057 A1 | 2/1993 |
| EP | 2 993 034 A1 | 3/2016 |
| JP | 2013-155675 A | 8/2013 |

OTHER PUBLICATIONS

Katkam V et al., "Fatigue life estimation for a circumferential joint of the aircraft fuselage structure through stress analysis", Research & Technology in the Coming Decades (CRT 2013, National Conference on Challenges in, pp. 1-4, Sep. 27-28, 2013 Ujire.

(Continued)

*Primary Examiner* — Andrew H Nguyen
(74) *Attorney, Agent, or Firm* — Dority & Manning, P.A.

(57) ABSTRACT

An airfoil for an aircraft engine is provided. The airfoil may include a plurality of composite plies extending in a chord-wise direction from a leading edge to a trailing edge and in a spanwise direction between an airfoil tip and an airfoil base. The airfoil may include at least one discontinuous ply having a first ply segment, a second ply segment, and a butt joint disposed between the first ply segment and the second ply segment. The butt joint may be disposed along a first fragment profile to frangibly attach the first and second ply segments.

14 Claims, 6 Drawing Sheets

(56) References Cited

U.S. PATENT DOCUMENTS

| | | |
|---|---|---|
| 8,915,471 B2 | 12/2014 | Nordman et al. |
| 8,939,406 B2 | 1/2015 | Dopker et al. |
| 8,960,606 B2 | 2/2015 | Diep et al. |
| 9,243,512 B1 | 1/2016 | Zatorski et al. |
| 9,914,282 B2* | 3/2018 | Roach ............... B32B 3/266 |
| 2005/0053466 A1 | 3/2005 | Finn et al. |
| 2005/0180854 A1 | 8/2005 | Grabau et al. |
| 2009/0081032 A1* | 3/2009 | Moroso ............... F01D 5/147 415/200 |
| 2009/0317238 A1* | 12/2009 | Wood ............... F01D 5/145 415/119 |
| 2010/0028594 A1* | 2/2010 | Kray ............... F04D 29/023 428/114 |
| 2014/0154092 A1* | 6/2014 | Dahl ............... F03D 1/0675 416/229 R |
| 2014/0271207 A1* | 9/2014 | Drane ............... F04D 29/023 416/193 A |
| 2015/0010406 A1* | 1/2015 | Torgard ............... B23P 15/04 416/230 |

OTHER PUBLICATIONS

Anand H.R. et al., "Structural analysis of the aircraft wing box with a splice joint in the bottom skin", in the bottom Research & Technology in the Coming Decades (CRT 2013), National Conference on Challenges in, pp. 1-5, Sep. 27-28, 2013, Ujire.

Extended European Search Report and Opinion issued in connection with corresponding EP Application No. 17154888.6 dated Jun. 12, 2017.

Kray, N. J., et al., Composite booster spool with separable composite blades, GE Application No. 61/990369, filed on May 8, 2014.

Machine translation and First Office Action and Search issued in connection with corresponding CN Application No. 201710070768.X dated Aug. 23, 2018.

* cited by examiner

FRANGIBLE GAS TURBINE ENGINE AIRFOIL

FIELD OF THE INVENTION

The present subject matter relates generally to airfoils, and more particularly, to airfoils in aircraft engines.

BACKGROUND OF THE INVENTION

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine. Larger shards may cause undesirable damage to the aircraft or engine. Some airfoils are formed with various features to increase overall airfoil strength or rigidity. Nonetheless, it is difficult to prevent all breaks from occurring. Moreover, such features may cause an airfoil to only partially break during certain loading events. If the break is not complete or clean, greater damage may occur as the partially severed blade gains energy from the engine's rotation. In some instances, the airfoil shards may be projected through the engine and to the aircraft or surrounding environment.

In addition to concerns over the size and speed at which an airfoil breaks, the shape of an airfoil's broken shards may dictate the damage caused by an extreme loading event. Knowing the likely size and shape of an airfoil's fragmented pieces may allow better predictions and preparation for such occurrences. Fragments having an unanticipated shape or size may cause greater level of damage to the engine. However, minimizing or modeling the size of an airfoil's fragments can be difficult. In existing airfoils, the location and size of an airfoil break will vary greatly depending on the magnitude and location of an extreme loading event. Predetermining or shaping the fragmented pieces in advance may allow users to minimize and predict the detrimental effects of an airfoil break.

Accordingly, further improvements are desired to aircraft airfoil structures. For instance, it may be desirable to control the impact or break behavior of an aircraft engine airfoil.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, an airfoil for an aircraft engine is provided. The airfoil may include a plurality of composite plies extending in a chordwise direction from a leading edge to a trailing edge and in a spanwise direction between an airfoil tip and an airfoil base. The airfoil may include at least one discontinuous ply having a first ply segment, a second ply segment, and a butt joint disposed between the first ply segment and the second ply segment. The butt joint may be disposed along a first fragment profile to frangibly attach the first and second ply segments.

In accordance with another embodiment of the present disclosure, a gas turbine engine is provided. The gas turbine engine may include an engine shaft, a compressor, a combustor, a turbine, and a fan section. The engine shaft may extend along the central axis, while the compressor may be attached to the engine shaft and extend radially about the central axis. The combustor may be positioned downstream of the compressor to receive a compressed fluid therefrom. The turbine may be turbine mounted on the engine shaft downstream of the combustor to provide a rotational force to the compressor. The fan may include a plurality of radially-extending fan blades operably connected to the engine shaft. Each fan blade may include a plurality of composite plies extending in a chordwise direction from a leading edge to a trailing edge and in a spanwise direction between an airfoil tip and an airfoil base. Each fan blade may also include at least one discontinuous ply having a plurality of composite plies extending in a chordwise direction from a leading edge to a trailing edge and in a spanwise direction between an airfoil tip and an airfoil base. Each fan blade may also include at least one discontinuous ply having a first ply segment, a second ply segment, and a butt joint disposed between the first ply segment and the second ply segment. The butt joint may be disposed along a first fragment profile to frangibly attach the first and second ply segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
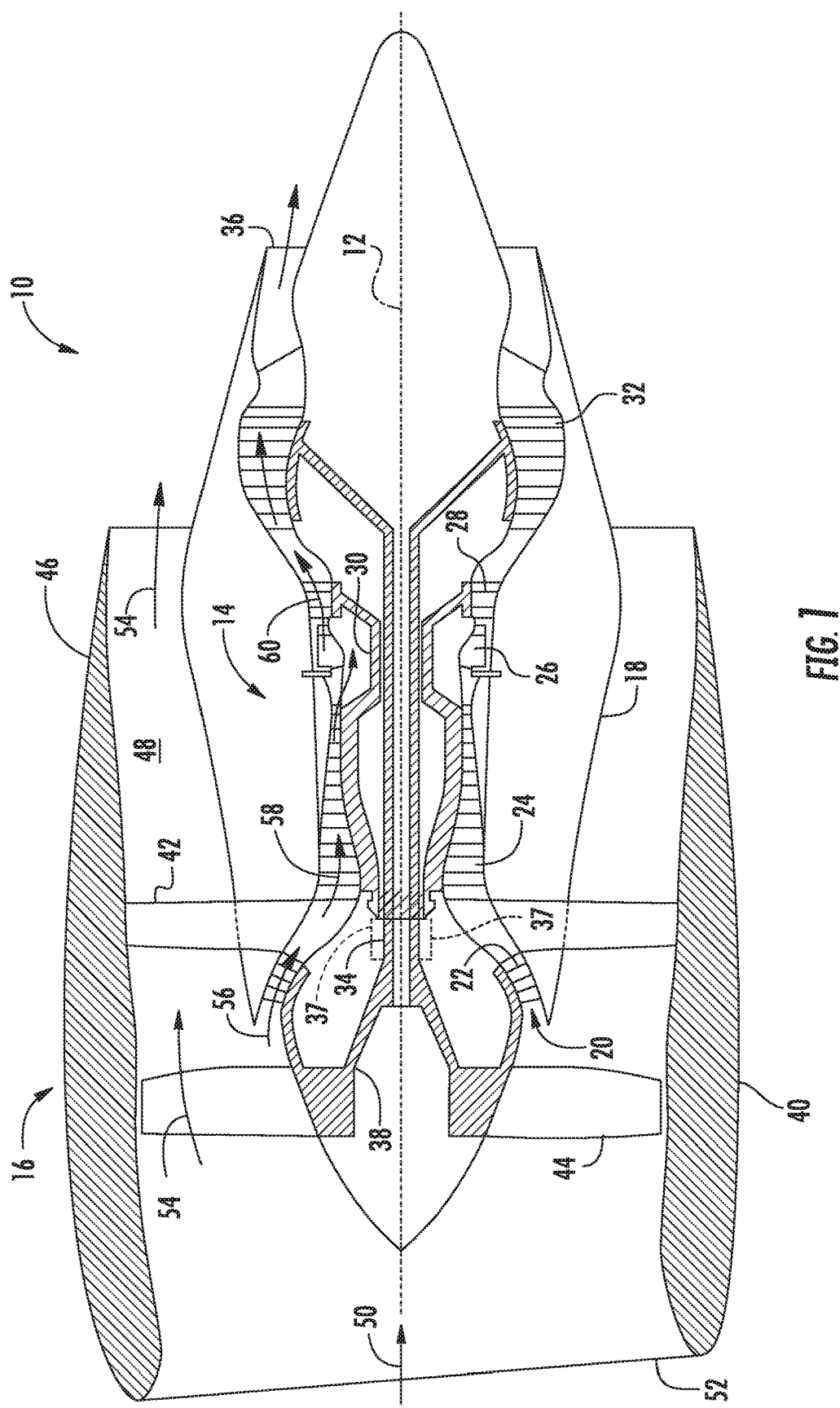
FIG. 1 provides a schematic cross-sectional view of a gas turbine engine in accordance with one embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

An airfoil is generally provided for use in a gas turbine engine. As will be described, the airfoil may be configured to break into fragments along one or more predetermined profiles during extreme impacts or loads. The airfoil may be formed as several plies bonded to each other as stacked sheets. One or more of the plies will be made up of multiple pieces. These pieces may generally be connected at, for instance, a resin butt joint. One or more plies having butt joints extending therethrough may determine or the airfoil's fragment profile(s).

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine is a high-bypass turbofan jet engine 10, with the engine 10 being shown having a longitudinal or axial centerline axis 12 extending therethrough for reference purposes. Although an exemplary turbofan embodiment is shown, it is anticipated that the present disclosure can be equally applicable to other engines, such as an open rotor, a turboshaft, or a turboprop configuration.

In general, the engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multistage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products may be expelled from the core engine 14 via an exhaust nozzle 36 to provide propulsive jet thrust.

Figure 2:
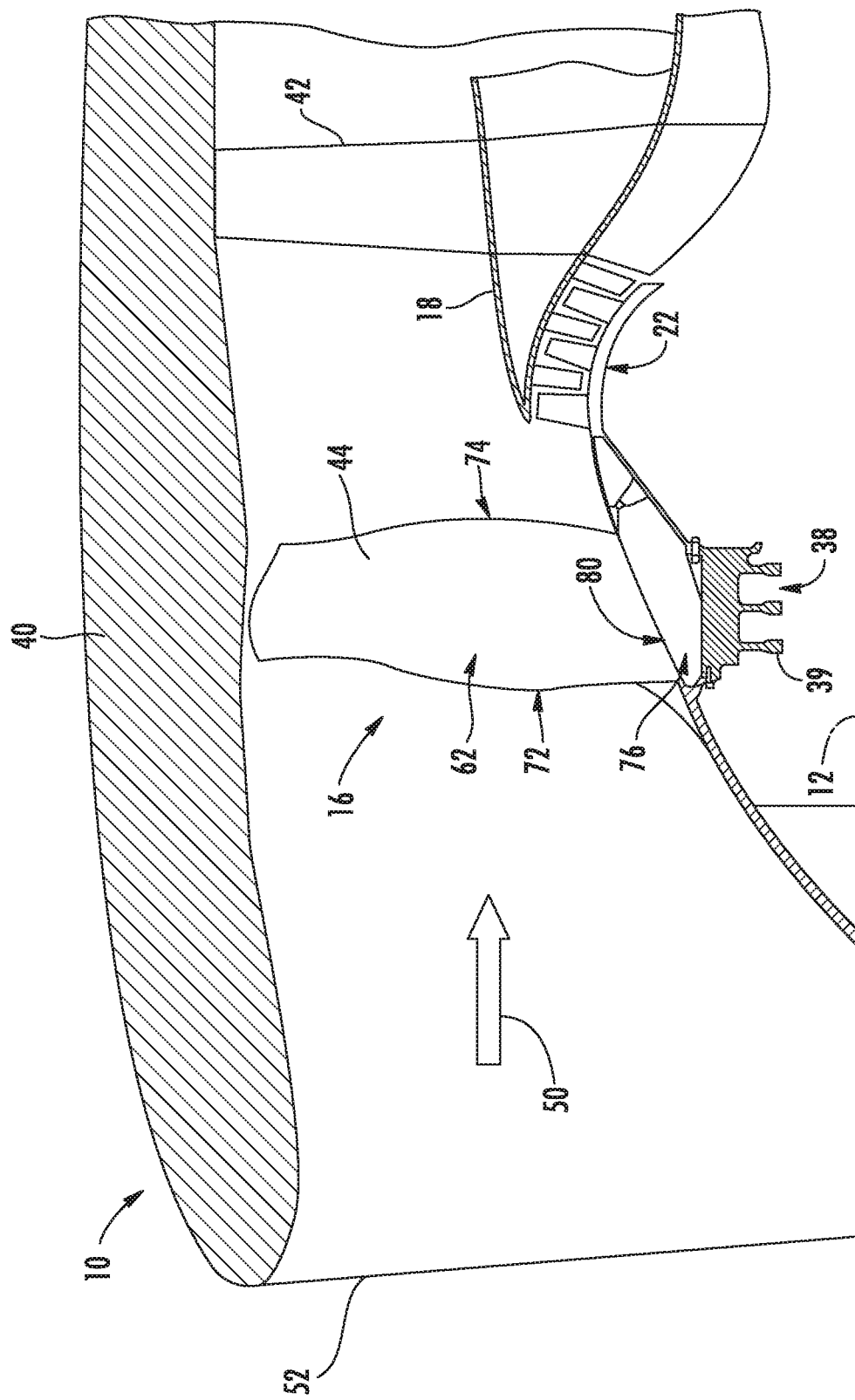
FIG. 2 provides an enlarged schematic cross-sectional view of a portion of a gas turbine engine in accordance with one embodiment of the present disclosure.

Additionally, as shown in FIGS. 1 and 2, the fan section 16 of the engine 10 generally includes a rotatable, axial-flow fan rotor 38 that configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 3:
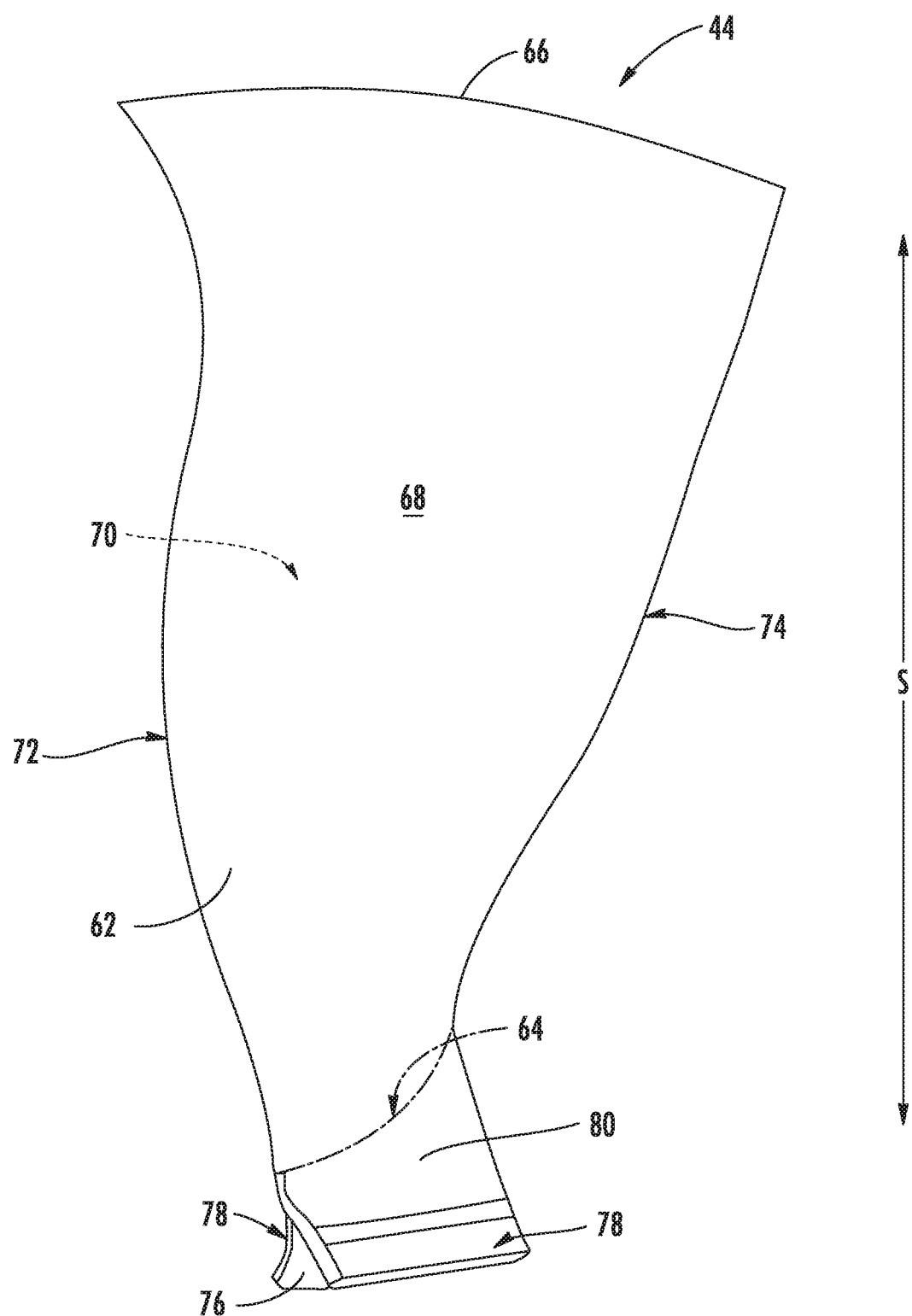
FIG. 3 provides a perspective view of a fan blade in accordance with one embodiment of the present disclosure.
Figure 5:
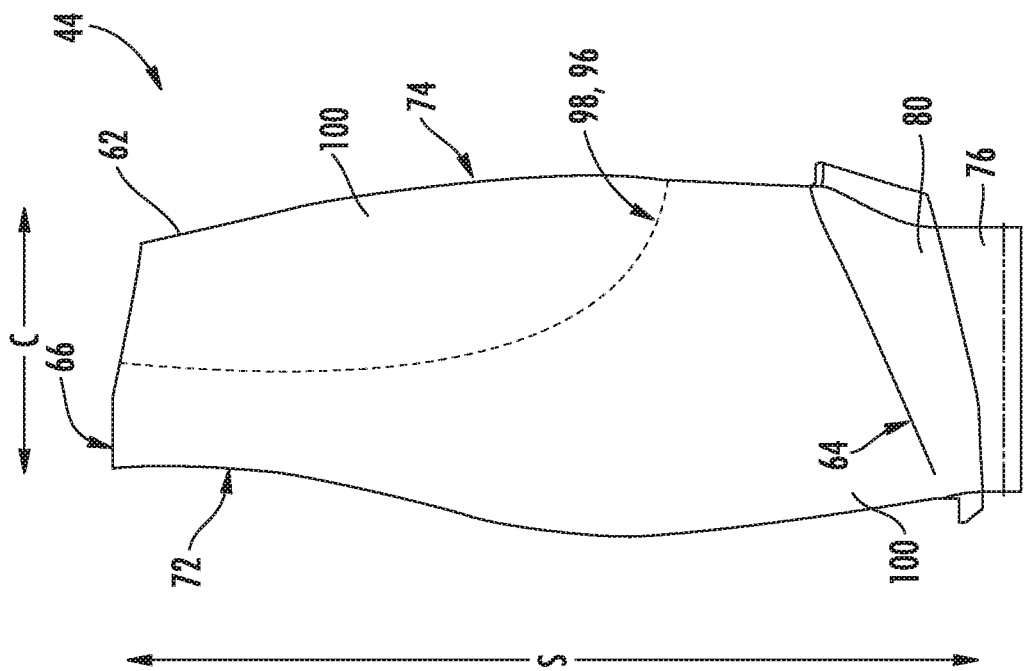
FIG. 5 provides a side elevation view of a fan blade in accordance with another embodiment of the present disclosure.
Figure 4:
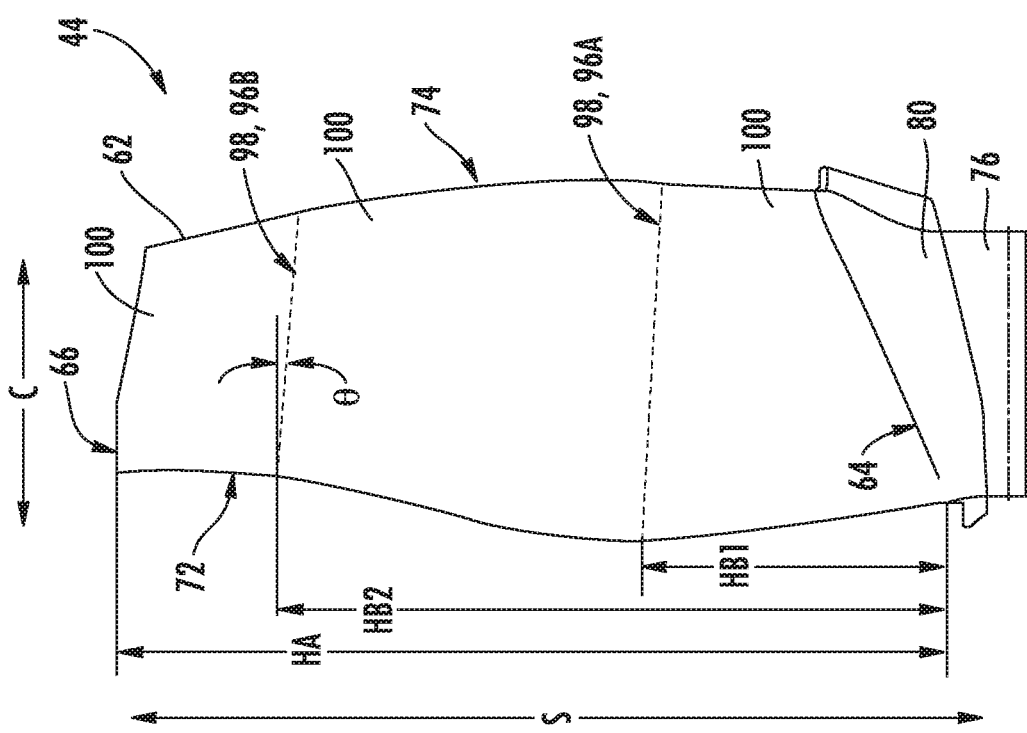
FIG. 4 provides a side elevation view of a fan blade in accordance with one embodiment of the present disclosure.

Referring to FIGS. 3 through 5, several exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S from an airfoil base 64 to an airfoil tip 66. First and second sides 68, 70 of the airfoil 62 extend from the airfoil's leading edge 72 to a trailing edge 74 along a chordwise direction C. In the illustrated embodiments, the sides 68, 70 of the fan blade 44 are configured as an opposed pressure side 68 and suction side 70. Optionally, each fan blade 44 includes an integral component having a root section 76 in the form of a straight axial dovetail with a pair of opposed pressure faces 78 leading to a transition section 80. When mounted within the engine 10, as illustrated in FIG. 2, the root section 76 is disposed in a dovetail sot of the fan rotor disk 39, thereby attaching the fan blades 44 to the fan rotor 38.

As illustrated in FIGS. 4 and 5, one or more fragment profile 98 is defined through each airfoil 62. Generally, the fragment profile 98 will be configured as the line or plane across which the airfoil 62 is predetermined to break, splitting the airfoil 62 into multiple airfoil fragments 100. As shown in FIG. 4, the fragment profile 98 of certain embodiments will extend linearly from the leading edge 72 to the trailing edge 74 in the chordwise direction C. Although the fragment profiles 98 of FIG. 4 are illustrated as having a negative angle θ relative to the chordwise direction C, one or more fragment profile 98 may define an angle θ that is greater than or equal to 0°. When mounted within an engine, optional embodiments of the fragment profile 98 may be configured substantially parallel to the centerline axis 12 (see FIG. 1). In other embodiments, such as the exemplary embodiment of FIG. 5, the fragment profile 98 extends partially in the chordwise direction C and partially in the spanwise direction S. For example, the embodiment of FIG. 5 extends arcuately from the airfoil tip 66 to the trailing edge 74. Some embodiments may include a similarly arcuate fragment profile 98 that extends between the leading edge 72 and the airfoil tip 66.

Alternative embodiments may include other suitable fragment profile configurations, including multiple profile paths and combinations thereof. In some alternative embodiments, at least one fragment profile 98 only partially traverses the airfoil 62. In other words, the fragment profile 98 does not extend to two extremes of the airfoil's dimensions. For instance, a fragment profile 98 may extend along the chordwise direction C within the airfoil 62 without reaching one or both of the leading edge 72 or trailing edge 74. Additionally, an arcuate fragment profile 98 may extend partially in the chordwise direction C and partially in the spanwise direction S without reaching one or both of the airfoil tip 66 or the airfoil edge 72, 74. In further embodiments, multiple intersecting fragment profiles 98 may be provided, crossing through each other to subdivide the airfoil 62.

Figure 6:
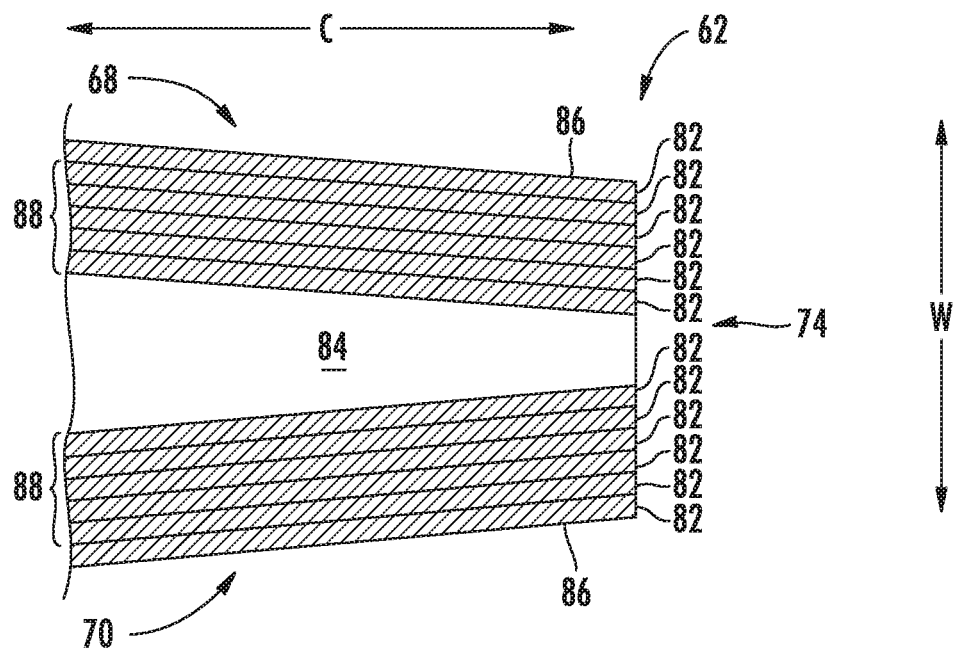
FIG. 6 provides a schematic cross-sectional view of a portion of an airfoil along a chordwise plane in accordance with one embodiment of the present disclosure.
Figure 7:
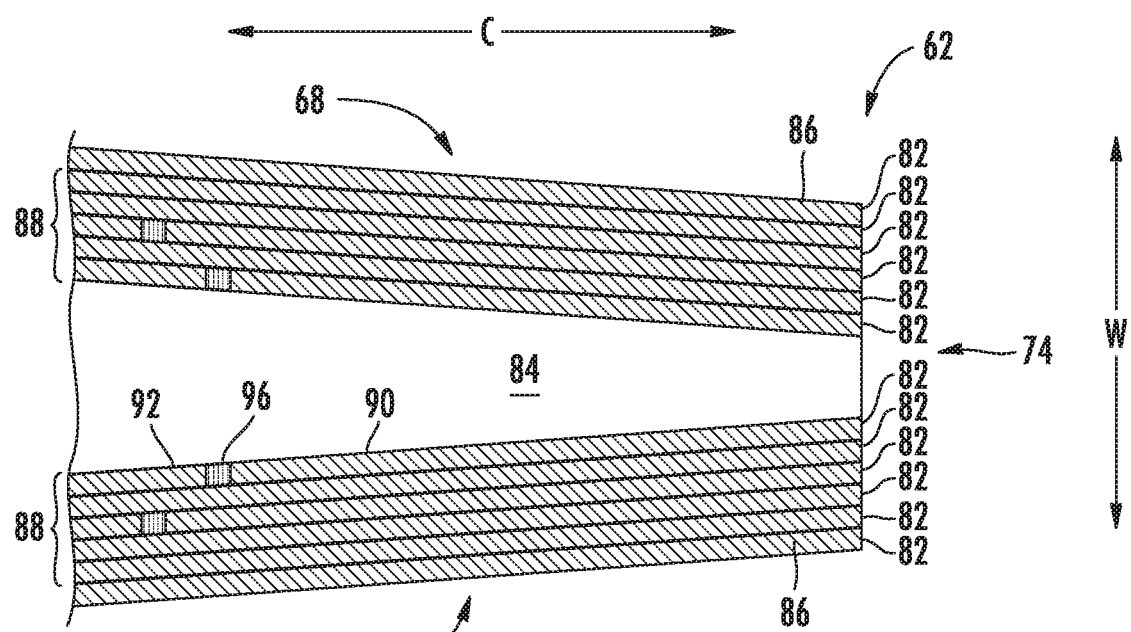
FIG. 7 provides a schematic cross-sectional view of a portion of an airfoil along a chordwise plane in accordance with another embodiment of the present disclosure.
Figure 8:
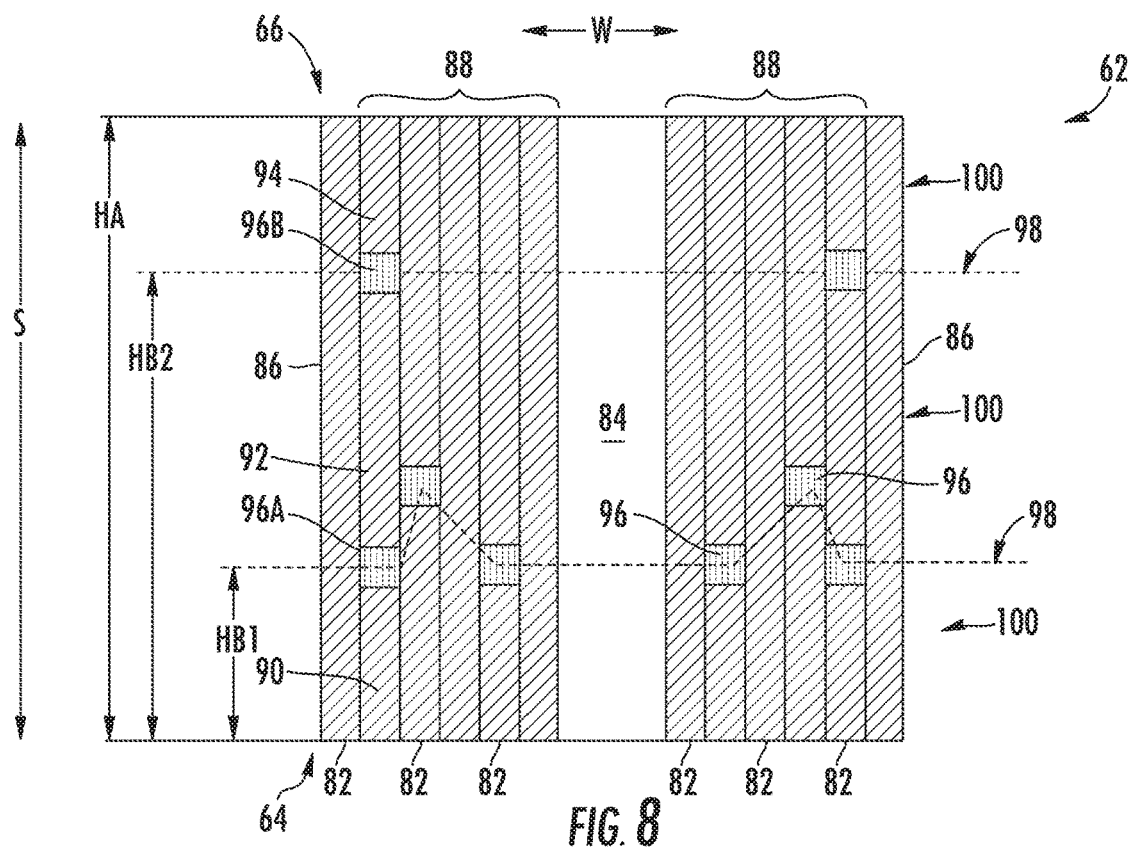
FIG. 8 provides a schematic cross-sectional view of a portion of an airfoil along a spanwise plane in accordance with one embodiment of the present disclosure.
Figure 9:
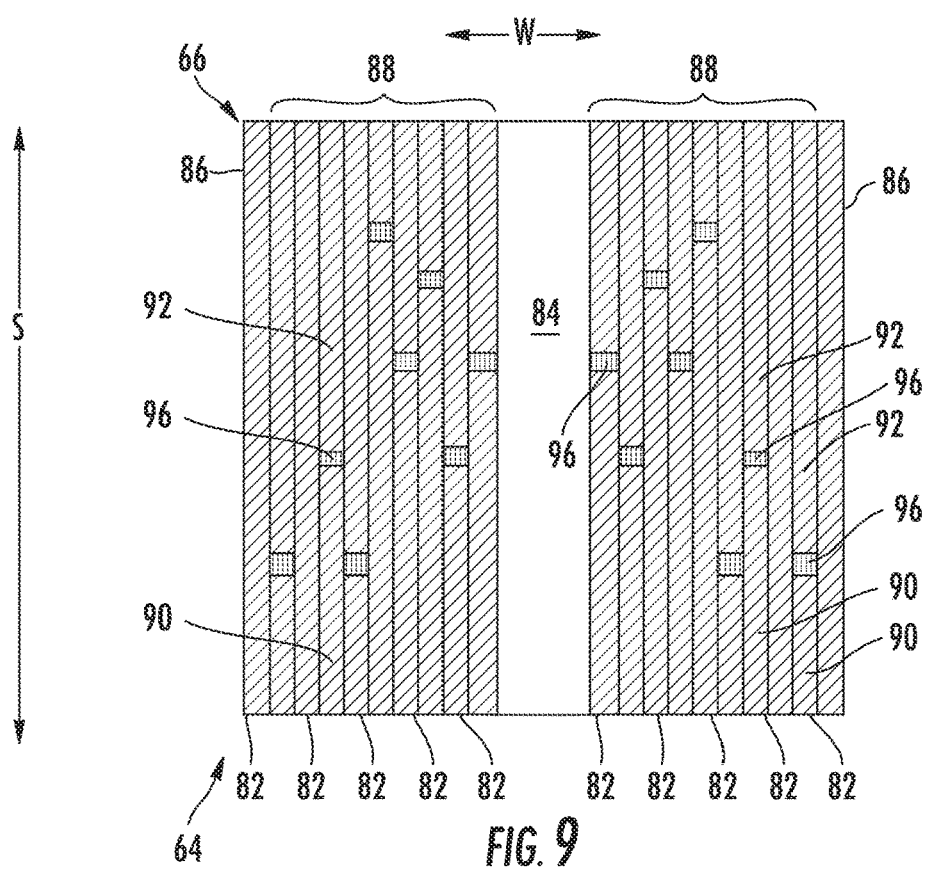
FIG. 9 provides a schematic cross-sectional view of a portion of an airfoil along a spanwise plane in accordance with another embodiment of the present disclosure.

Turning to FIGS. 6 through 9, several cross-sectional views of exemplary airfoils are provided. The airfoils 62 of FIGS. 6 and 7 are shown as partial overhead cross-sections, while the airfoils of FIGS. 8 and 9 are shown as rear-facing cross-section. Most, if not all, of each airfoil 62 is composed of a composite material bonded together as laminate sheets or plies. The term "composite" refers generally to a material containing a reinforcement such as fibers or particles supported in a binder or matrix material. The overall airfoil layup may include several layers or plies 82 embedded in a matrix and oriented substantially parallel to the pressure side 68 and/or the suction side 70. In some embodiments, the composite material includes example of a carbonaceous (e.g. graphite) fiber embedded in a resin material such as an epoxy. The fibers may be unidirectionally aligned into a tape that is impregnated with a resin material. Such "prepreg" tape can be formed into a part shape, and cured via an autoclaving process or press molding to form a light weight, stiff, relatively homogeneous article. The unidirectionally-aligned tape of adjacent plies may be positioned at parallel angles, perpendicular angles, or other suitable offset angles, e.g., 45°, relative to one another. The positioning may be selected according to the desired rigidity or frangibility of the airfoil 62.

Although an exemplary carbon fiber material is described, other airfoil 62 embodiments may be formed via similar or alternative methods to include another composite material. For instance, certain airfoil 62 embodiments will include plies of another suitable composite material, such as a ceramic matrix composite (CMC), polymer matric composite (PMC), or metal matric composite (MMC).

In the illustrated embodiments of FIGS. 6 through 9, a plurality of composite plies 82 are bonded together as laminate stacks on an airfoil core 84. The stacks generally extend outward across a widthwise direction W. As shown, the plurality of composite plies 82 includes an outermost ply 86 at the pressure side 68 and the suction side 70. The outermost ply 86 may be configured as a single sheet or multiple sheets enclosing one or more inner plies 88 in the chordwise direction C from the leading edge 72 (see FIG. 5) to the trailing edge 74. Moreover, the outermost ply 86 may further enclose the inner plies 88 and airfoil core 84 in spanwise direction S from the airfoil base 64 to the airfoil tip 66. Each inner ply 88 may be disposed substantially parallel an outermost ply 86.

The airfoil core 84 forms the base guide for the inner plies 88 and outermost ply/plies 86. Although the airfoil core 84 is shown as a solid body for the sake of clarity, optional embodiments of the airfoil core 84 may be configured as additional plies or composite plies 82 parallel to one or more of the outermost plies 86, i.e., similar to the inner plies 88. For instance, in optional embodiments, the airfoil core 84 may include multiple composite plies 82 that are each continuous and free of any butt joint. Some continuous plies may extend uninterrupted or unbroken from the airfoil base 64 to the airfoil tip 66. Other embodiments of the airfoil core 84 may include one or more discontinuous plies having a corresponding butt joint 96. Further additional or alternative embodiments of the airfoil core 84 may define a hollow cavity extending partially or fully from the airfoil base 64 to the airfoil tip 66. Optionally, a stiffening material may be placed within or fill the hollow cavity. For instance, a woven core, a foam, or a suitable low density material may substantially fill a hollow cavity of the airfoil core 84.

As shown in FIGS. 7 through 9, some composite plies 82 are formed as discontinuous ply members. Each discontinuous ply include an aligned first ply segment 90 and second ply segment 92 joined by a butt joint 96. Each ply segment may be formed from the same material or, optionally, discrete materials such that the first ply segment 90 is formed from a different material than the second ply segment. The different materials may be distinguished by, e.g., discrete binder materials, discrete fiber or tape alignment, discrete fiber materials, or another geometric or chemical characteristic. The butt joint 96 may include, for instance, a resin pool that frangibly attaches the two ply segments 90, 92. In certain embodiments the resin pool of the butt joint 96 will maintain a constant thickness in one of the spanwise direction S or the chordwise direction C. The resin may include a polymeric resin or epoxy. Optionally, the polymeric resin may include a material similar to or discrete from a matrix reinforcement included in the individual composite plies 82. In the embodiment of FIG. 7, the butt joint 96 attaches two aligned ply segments 90, 92 that are separated in the chordwise direction C. As a result, the butt joint 96 extends at least partially in the spanwise direction S (see FIG. 5).

Certain embodiments of the airfoil 62 include multiple continuous plies that are substantially free of any butt joint, as well as multiple discontinuous plies having one or more embedded butt joint 96. As described above, each discontinuous ply includes a first ply segment 90 and a second ply segment 92 frangibly attached by a butt joint 96. In the illustrated embodiments of FIGS. 8 and 9, each butt joint 96 extends at least partially in the chordwise direction C. In optional embodiments, the butt joints 96 extend forward from the trailing edge 74 (see FIGS. 4 and 5) to another portion of its corresponding ply 82 and airfoil 62. In certain embodiments, at least one uninterrupted butt joint 96 extends fully from the trailing edge 74 to the leading edge 72 (see FIG. 4), to define a fragment profile 98.

The exemplary embodiments of FIGS. 7 through 9 each include multiple discontinuous plies. As shown, in certain embodiments, multiple butt joints 96 are disposed at off-set or staggered positions. In other words, at least two butt joints 96 will be disposed at different chordwise positions (see FIG. 7), or disposed at different spanwise heights, e.g., maximum heights, relative to the airfoil base 64 (see FIG. 8). In some such embodiments, a fragment profile 98 is formed across the widthwise direction W of the airfoil 62, as illustrated in FIG. 8. Optionally, a discontinuous ply may include multiple butt joints 96. For instance, as provided in the exemplary embodiment of FIG. 8, some discontinuous ply embodiments are configured as a three discrete ply segments 90, 92, 93. A first butt joint 96A is provided at a first break height HB1 to attach the first and second ply segments 90, 92. A second butt joint 96B is provided at a second break height HB2 to attach the second and third ply segments 92, 93. During an extreme impact, the discontinuous ply and/or overall airfoil 62 may separate along multiple fragment profiles 98 corresponding to butt joints 96 at different break heights HB1, HB2, e.g., at the first butt joint 96A and second butt joint 96B.

As shown in FIG. 8, the break heights HB1, HB2 are defined relative to an overall airfoil height HA, e.g., maximum height, between the airfoil base 64 and the airfoil tip 66. For instance, the first break height HB1 of certain embodiments the first break height HB1 of the first butt joint 96A is at a point greater than 25% of the overall airfoil height HA. In other words, more ¼$^{th}$ of the distance between the airfoil base 64 and airfoil tip 66. In additional or alternative embodiments, a second break height HB2 is defined for the butt joint 96 at a point greater than 75% of the overall airfoil height HA. Although only a first butt joint 96A and second butt joint 96B are described in the above embodiments, further embodiments may include three or more butt joints 96 at multiple break heights HB1, HB2. Additional or alternative embodiments may include the first butt joint 96A and second butt joint 96B at separate break heights HB1, HB2 for separate discrete discontinuous ply segments 90, 92, 93. In other words, the multiple staggered butt joints 96 may define multiple corresponding fragment profiles 98.

In embodiments wherein multiple butt joints 96 are staggered, the fragment profile 98 may generally follow a sequential path through the composite plies 82. In other words, in staggered butt joint 96 embodiments, a fragment profile 98 may extend unevenly in the widthwise direction to create fragment profiles 100 having an uneven or jagged profile that generally corresponds to the positions of the various butt joints 96. Moreover, in some embodiments, multiple butt joints 96 are configured to define multiple fragment profiles 98 across the airfoil 62. After an extreme impact, the airfoil 62 of some such embodiments may separate at the butt joints 96 along the multiple fragment profiles 98.

Returning to FIGS. 4 and 5, each fragment profile 98 will generally correspond to one or more butt joint 96 of a discontinuous ply (see FIGS. 7 through 9). In other words, the fragment profile 98 may substantially follow the butt joint 96 in the chordwise C and spanwise S directions. In turn, multiple fragment profiles 98 may be defined at separate break heights HB1, HB2. The airfoil 62 is optionally configured to sever and separate at each butt joint 96. During an extreme impact event, the separation at the butt joints 96 will cascade to any continuous ply to fully sever the airfoil 62 into discrete airfoil fragments 100. The fragment profile 98 thereby defines the overall separation and shape for each airfoil fragment 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil for an aircraft engine, the airfoil comprising:
   a plurality of composite plies extending in a chordwise direction from a leading edge to a trailing edge and in a spanwise direction between an airfoil tip and an airfoil base, wherein the airfoil defines an overall airfoil height between the airfoil base and airfoil tip, the plurality of composite plies including a first discontinuous ply including
   a first ply segment,
   a second ply segment,
   a first butt joint disposed at a predetermined break location between the first ply segment and the second ply segment along a first fragment profile to frangibly attach the first and second ply segments, wherein the first butt joint is positioned at a first break height, the first break height being greater than 25% of the overall airfoil height, and
   a second butt joint extending through the airfoil along a second fragment profile, wherein the second butt joint is positioned at a second break height, the second break height being greater than 75% of the overall airfoil height, and
   the plurality of composite plies including at least one inner continuous ply extending unbroken from the airfoil base to the airfoil tip,
   wherein the airfoil defines a first airfoil fragment extending from the airfoil base to the first fragment profile, a second airfoil fragment extending from the first fragment profile to the second fragment profile, and a third airfoil fragment extending from the second fragment profile to the airfoil tip, and wherein the airfoil is configured to separate into the fragments following an extreme impact event.

2. The airfoil of claim 1, wherein the plurality of composite plies includes a second discontinuous ply, the first and the second butt joints being staggered in the spanwise direction.

3. The airfoil of claim 1, wherein at least one of the first butt joint or the second butt joint extends at least partially along the chordwise direction.

4. The airfoil of claim 1, wherein the first ply segment includes a first composite material and the second ply segment includes a second composite material, the first composite material being different from the second composite material.

5. The airfoil of claim 1, wherein at least one of the first butt joint or the second butt joint extends at least partially in the spanwise direction.

6. The airfoil of claim 1, wherein at least one of the first butt joint or the second butt joint comprises a resin material.

7. The airfoil of claim 2, wherein the at least one inner continuous ply extends unbroken from the airfoil base to the airfoil tip and between the first and the second discontinuous plies.

8. A gas turbine engine defining a central axis, the gas turbine engine comprising:
   an engine shaft extending along the central axis;
   a compressor attached to the engine shaft and extending radially about the central axis;

a combustor positioned downstream of the compressor to receive a compressed fluid therefrom;

a turbine mounted on the engine shaft downstream of the combustor to provide a rotational force to the compressor; and a fan section including a plurality of radially-extending fan blades operably connected to the engine shaft, each fan blade including an airfoil comprising a plurality of composite plies extending in a chordwise direction from a leading edge to a trailing edge and in a spanwise direction between an airfoil tip and an airfoil base, wherein the airfoil defines an overall airfoil height between the airfoil base and airfoil tip, the plurality of composite plies including a first discontinuous ply including a first ply segment, a second ply segment, a first butt joint disposed at a predetermined break location between the first ply segment and the second ply segment along a first fragment profile to frangibly attach the first and second ply segments, wherein the first butt joint is positioned at a first break height, the first break height being greater than 25% of the overall airfoil height, and a second butt joint extending through the airfoil along a second fragment profile, wherein the second butt joint is positioned at a second break height, the second break height being greater than 75% of the overall airfoil height, and the plurality of composite plies including at least one inner continuous ply extending unbroken from the airfoil base to the airfoil tip, wherein the airfoil defines a first airfoil fragment extending from the airfoil base to the first fragment profile, a second airfoil fragment extending from the first fragment profile to the second fragment profile, and a third airfoil fragment extending from the second fragment profile to the airfoil tip, and wherein the airfoil is configured to separate into the fragments following an extreme impact event.

9. The gas turbine engine of claim 8, wherein the plurality of composite plies includes a second discontinuous ply, the first and the second butt joints being staggered in the spanwise direction.

10. The gas turbine engine of claim 8, wherein at least one of the first butt joint or the second butt joint extends at least partially along the chordwise direction.

11. The gas turbine engine of claim 8, wherein at least one of the first butt joint or second butt joint extends uninterrupted from the trailing edge to the leading edge.

12. The gas turbine engine of claim 8, wherein at least one of the first butt joint or the second butt joint extends at least partially in the spanwise direction.

13. The gas turbine engine of claim 8, wherein at least one of the first butt joint or the second butt joint comprises a resin material.

14. The gas turbine engine of claim 9, wherein the at least one inner continuous ply extends unbroken from the airfoil base to the airfoil tip and between the first and the second discontinuous plies.

* * * * *